United States Patent [19]
Kidd

[11] Patent Number: 5,410,616
[45] Date of Patent: Apr. 25, 1995

[54] LOOP-UP TABLE IMAGE SCALING FOR RATIONAL FACTORS

[75] Inventor: Robert C. Kidd, Ann Arbor, Mich.

[73] Assignee: Unisys Corporation, Bluebell, Pa.

[21] Appl. No.: 201,715

[22] Filed: Feb. 25, 1994

Related U.S. Application Data

[63] Continuation of Ser. No. 889,643, May 28, 1992, abandoned.

[51] Int. Cl.$^6$ .............................................. G06K 9/36
[52] U.S. Cl. ........................................ 382/47; 382/44; 345/127
[58] Field of Search ............... 382/47, 44, 41, 54; 395/139; 345/127, 129, 130; 358/528, 451

[56] References Cited

U.S. PATENT DOCUMENTS

| | | | |
|---|---|---|---|
| 4,153,896 | 5/1979 | White | 340/731 |
| 4,254,409 | 3/1981 | Busby | 340/731 |
| 4,267,573 | 5/1981 | Chaikin | 364/515 |
| 4,303,948 | 12/1981 | Arai et al. | 358/287 |
| 4,357,604 | 11/1982 | Imazeki et al. | 340/731 |
| 4,367,533 | 1/1983 | Wiener | 364/519 |
| 4,409,591 | 10/1983 | Simkovitz | 340/731 |
| 4,569,081 | 2/1986 | Mintzer et al. | 382/47 |
| 4,578,812 | 3/1986 | Yui | 382/41 |
| 4,703,352 | 10/1987 | David | 358/140 |
| 4,725,892 | 2/1988 | Suzuki et al. | 358/287 |
| 4,833,531 | 5/1989 | Abe et al. | 358/77 |
| 4,872,064 | 10/1989 | Tutt et al. | 358/464 |
| 5,048,102 | 9/1991 | Tararine et al. | 382/41 |
| 5,054,100 | 10/1991 | Tai | 382/47 |
| 5,125,042 | 6/1992 | Kerr et al. | 382/47 |
| 5,148,497 | 9/1992 | Pentland et al. | 382/54 |

OTHER PUBLICATIONS

"Interpolation and Decimation of Digital Signals—A Tutorial Review", (Proceedings of the IEEE, vol. 69, No. 3), Crochiere & Rabiner, Mar. 1981, U.S.A., pp. 300-331.

IBM Journal of Research and Development—vol. 31, No. 1, K. L. Anderson, Jan. 1987, U.S.A., pp. 20-26.

Primary Examiner—Yon J. Couso
Attorney, Agent, or Firm—Harness, Dickey & Pierce

[57] ABSTRACT

A method and apparatus for scaling image pixel data by a rational scale factor of L/M utilizes look-up tables for input pixel addressing and convolution of up to two adjacent input pixels which offers an improved implementation of a conventional sampling rate conversion system wherein the input pixels are upsampled by a factor of L by inserting L-1 zeroes, interpolating the zero upsamples by finite impulse response techniques and down-sampling the interpolated data by a factor of M.

12 Claims, 2 Drawing Sheets

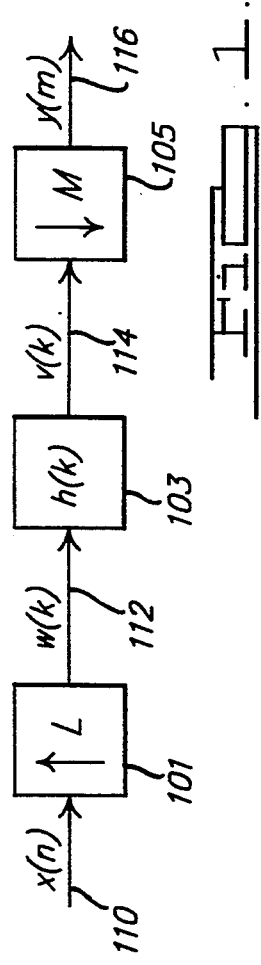
FIG. 1.
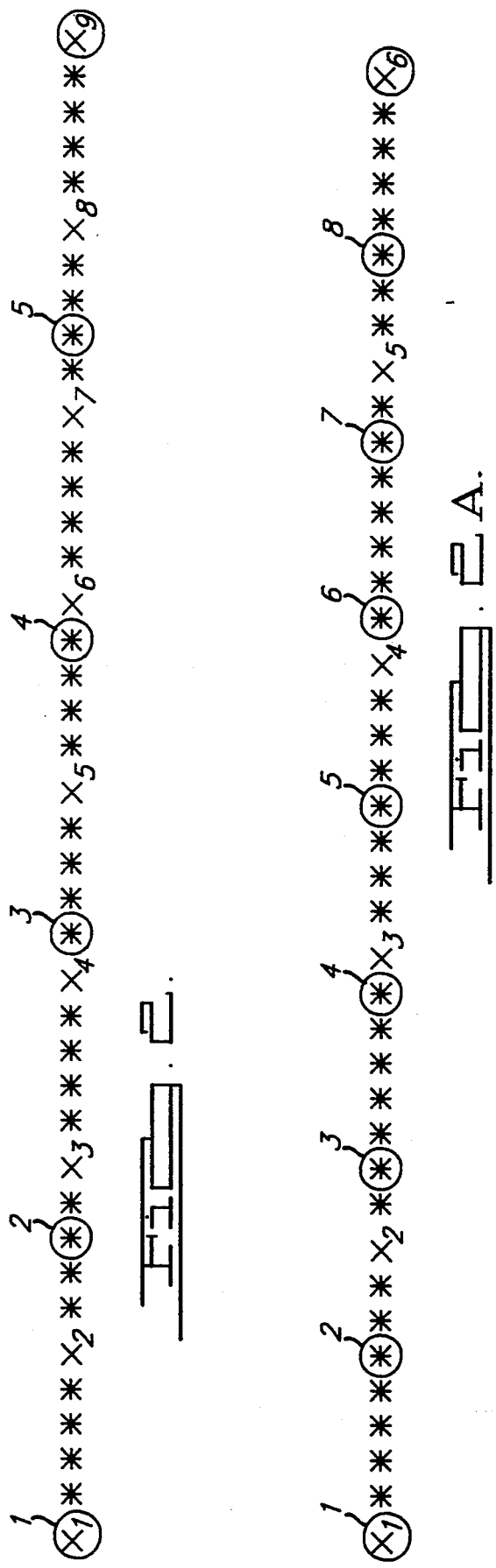
FIG. 2.
FIG. 2A.

LOOP-UP TABLE IMAGE SCALING FOR RATIONAL FACTORS

This a continuation U.S. patent application Ser. No. 07/889,643, filed May 28, 1992, now abandoned.

BACKGROUND OF THE INVENTION

The invention relates generally to digital image scaling whereby raster image of one particular spatial resolution is converted to a like image having a different spatial resolution. More particularly, the invention relates to a method and apparatus for reducing or enlarging gray-scale images by a rational scale factor.

Image scaling is often employed when an image is created, processed or stored on one system or device or subsequently transferred for use, display or output to another device. Image enlarging is especially useful where raster images which require large amounts of computer memory are stored in compressed form and then enlarged for display or hard copy output.

There is therefore seen a need for a fast and computationally efficient method for reducing or enlarging gray-scale images by a variable amount. It is also desirable that the method be useful on images having any number of gray levels and that the method produce output images of as good or better quality than those produced using other known scaling techniques. Finally, such methods should be easily and conveniently implementable in hardware.

SUMMARY OF THE INVENTION

Accordingly, a method for scaling image data organized as rows of input pixels by a rational factor of L/M, wherein the input pixels are upsampled by a factor of L by inserting L-1 zeros, interpolating the zero upsamples by finite impulse response techniques, and down-sampling interpolated data by a factor of M, features the improvement of, combining upsampling, interpolating and downsampling functions into a single operation wherein only inserted zero samples which will be retained in the output scaled image in the down sampling process are interpolated.

The invention also contemplates apparatus for scaling image data organized as rows of input pixels by a rational factor of L/M including a memory for storing the rows of input pixels, a period address generator for sequentially generating L addresses, an input pixel interpolator coupled to the memory and the period address generator and operative to generate L output pixels for every M input pixels, the interpolator operative to generate an interpolated output pixel as a function of two current adjacent input pixels of interest, and an address incrementor coupled to the period address generator and the memory and operative to select a next two adjacent input pixels for a subsequent operation of the interpolator.

BRIEF DESCRIPTION OF THE DRAWINGS

The objects and features of the invention will become apparent from a reading of a detailed description in conjunction with the drawings, in which:

FIG. 1 is a functional block diagram of a conventional rational factor, sampling rate conversion system;

FIG. 2 depicts one full period of the input and output pixel pattern for a scaling arrangement of the invention having a rational scale factor of ⅝;

FIG. 2A depicts one full period of the input and output pixel pattern for a scaling arrangement of the invention having a rational scale factor of 8/5.

DETAILED DESCRIPTION

Figure 3:
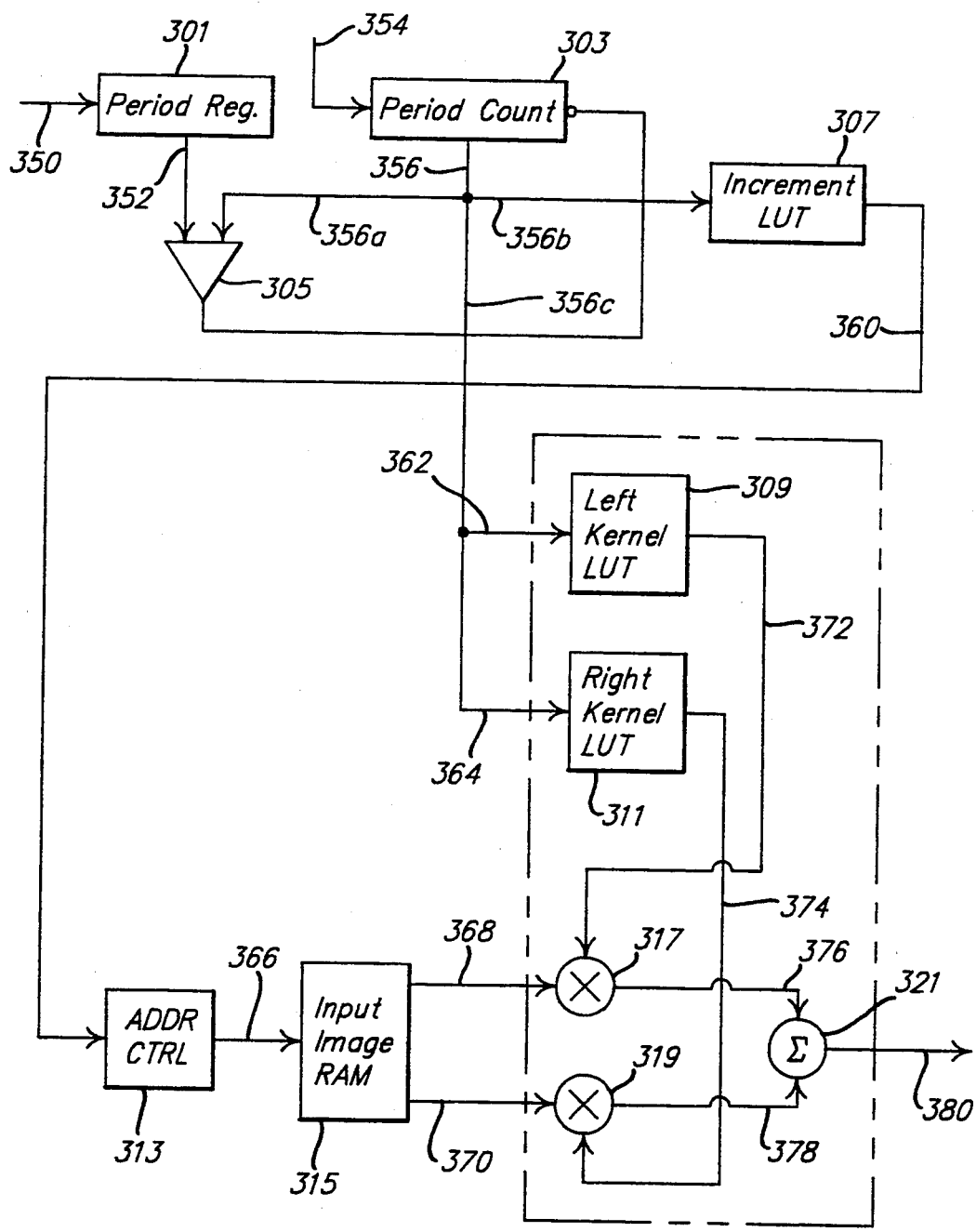
FIG. 3 sets forth a block diagram of a system for generating interpolated output pixels in accordance with the principles of the invention.

An image scaling method of the invention is based upon an improved implementation of a known technique for sampling rate conversion by an arbitrary rational factor (i.e. L/M, L and M being integers). In the conventional approach, the basic strategy of upsampling by inserting zero-valued samples followed by interpolation and decimation is employed. In the novel implementation disclosed herein, much of the method is implemented with one or more look-up tables. This limits the interpolating filter to be a function of, at most, two input pixels. Limiting the interpolating filter such that it is a function of, at most, two pixels ensures that the output image will exhibit both blur and aliasing with respect to the ideal. Still, the method can provide acceptable image quality over a wide range of rational scale factors. Additionally, the scale factor and precise interpolating function can be made selectable. Finally, the method lends itself well to hardware implementation, since the implementation suggested requires only look-up tables, counters and other conventional logic and arithmetic elements.

The scaling arrangement disclosed may be used for resolution-reduction of camera data prior to preprocessing and compression of image pixel data. Lower resolution images are often required to meet dual compressed packet size and image quality goals. Having a flexible scaler enables one to vary the resolution as appropriate when image data packet size and/or image quality goals change. The invention is also well-suited for use in a modular image data decompressor, since it allows for both enlargement and reduction with substantial scale factor resolution. This will allow the modular decompressor to scale images, captured at varying spatial resolutions, to specific physical sizes on monitors of nearly any spatial resolution.

FIG. 1 shows a general block diagram of a conventional rational factor, sampling rate conversion system. Such a system is described in *Interpolation And Decimation Of Digital Signals—A Tutorial Review*, Crochiere and Rabiner, Proceedings of the IEEE, March, 1981, pp. 300–331. As seen from FIG. 1, the input signal x(n) appearing at input 110 is coupled to a sampling rate expander 101 which upsamples the input signal by a factor of L. The output of upsampler 101 is coupled via lead 112 and carries an upsampled signal designated w(k) which is input to a low pass finite impulse response filter 103 having an impulse response h(k). The output of the filter 103 is a filtered signal v(k) on lead 114 which is input to a sampling rate compressor 105 which downsamples the signal v(k) by a factor of M to produce at output 116 the scaled signal y(m).

The input signal, x(n) with discrete Fourier transform $X(e^{j\omega})$, is upsampled by a factor of L by inserting L-1 zeros between each pair of values of x(n). The resulting upsampled signal w(k), is related to x(n) by $$w(k) = \begin{cases} x\left(\dfrac{k}{L}\right) & \text{for } k = 0, \pm L, \pm 2L, \ldots \\ 0, & \text{otherwise} \end{cases} \quad (1)$$

$W(e^{j\omega})$, the discrete Fourier transform of $W(k)$ is related to $X(e^{j\omega})$ by $$W(e^{j\omega}) = X(e^{j\omega L}) \quad (2)$$

$W(e^{j\omega})$ contains the original baseband information of $X(e^{j\omega})$ along with "images" of the baseband information at integer multiples of plus or minus $2\pi L$.

The upsampled signal $w(k)$ is then passed through a low pass filter with impulse response $h(k)$ and frequency response $H(e^{j\omega})$. The purpose of this filter is to interpolate the zero samples of $w(k)$ removing the "image" spectra and to band limit (according to the Nyquist criterion) prior to decimation by a factor of M. To give the theoretically correct output signal $y(m)$, which is free of aliasing and pass band attenuation, the filter should have a frequency response given by $$H(e^{j\omega}) = \begin{cases} L & |\omega| \leq \min\left[\dfrac{\pi}{L}, \dfrac{\pi}{M}\right] \\ 0, & \text{otherwise} \end{cases} \quad (3)$$

Since such a filter is not physically realizable, various compromises are made which generally introduce both passband attenuation and aliasing. In particular, for the implementation of this invention, the filter is required to be implemented with finite impulse response techniques and to have an impulse response less than or equal to 2L-1 samples in length. $V(e^{j\omega})$, the discrete Fourier transform of the filtered signal $v(k)$, is related to the input signal by $$V(e^{j\omega}) = X(e^{j\omega L}) H(e^{j\omega}) \quad (4)$$

Finally, the interpolated signal is subsampled by a factor of M. That is $$y(m) = v(Mm) \quad (5)$$

Direct implementation of a rational factor sampling rate conversion system as shown in FIG. 1 is inherently inefficient since often a majority of the samples of the interpolated signal $v(k)$ are discarded in the subsampling process. Thus, it is desirable to compute interpolated values only as sample indices which will be retained after subsampling. These samples occur at values of k which satisfy k modulo M = 0

An implementation which constantly performs modulo arithmetic and computes output samples with an arbitrary interpolating filter still requires a substantial amount of computation. The implementation disclosed is based upon the fact that a system which effects rational sampling rate conversion is a periodically time-varying linear system. Specifically, the periodic nature of the system is crucial to the implementation. For a sampling rate conversion factor L:M, where L/M is a reduced fraction, the period of the system is L output samples. FIG. 2 illustrates this periodicity for a scale factor of 5:8. In the figure ⊗ represents an original pixel value which becomes part of the scaled image and represents an interpolated pixel value which becomes part of the scaled image. X represents an original pixel which is discarded, while * represents an interpolated pixel which not used. FIG. 2 shows one complete one dimensional period for 5:8. For two dimension signals, the periodicity extends directly to the second dimension. Note that one period in FIG. 2 contains 8 input pixels, $X_1-X_8$, and 5 output pixels, 1-5 as expected.

FIG. 2A illustrates the periodicity for an inverse scale factor of 8:5. Again, the same symbology is used and it is to be noted that for every five input pixels, $X_1-X_5$, there are 8 output pixels, 1-8, again as expected.

The periodicity of such a system can be exploited using the implementation of the invention. With the constraint that the interpolating function span at most two input pixels, one can arrive at an implementation such as shown in the block diagram of FIG. 3. Note that the system shown performs scaling in only one dimension. For an image, scaled rows must be buffered and then passed through the system again to scale along the columns of pixels. Many possible schemes exist for handling two dimensional signals with a system similar to that of FIG. 3. In any event, the pseudo-code set forth in the Appendix will handle two dimensional scaling in accordance with the principles of the invention.

With reference to FIG. 3, input data from a device, such as an image data processing module (not shown), is input to period register 301 via bus 350 and to period counter 303 via bus 354. The outputs of period register 301 and period counter 303 are coupled via buses 352 and 356a, respectively, to a comparator 305 whose output is coupled via bus 358 to a clearing input of period counter 303.

The output of period counter 303 is additionally coupled via bus 356b to an increment look-up table 307 and via bus 356c to input 362 of left kernel look-up table 309 and input 364 of right kernel look-up table 311. The output of left kernel look-up table 309 is coupled via bus 372 to a first input of multiplier 317, while the output of right kernel look-up table 311 is coupled via bus 374 to a first input of multiplier 319.

The output of increment look-up table 307 is coupled via bus 360 to an address controller 313 whose address output is coupled via bus 366 to input image RAM 315. A first output of RAM 315 is coupled via bus 368 to a second input of multiplier 317, while a second output of RAM 315 is coupled via bus 370 to a second input of multiplier 319.

An output of multiplier 317 is coupled via bus 376 to a first input of adder 321, while an output of second multiplier 319 is coupled via bus 378 to a second input of adder 321. The output of adder 321 presents the interpolated pixel value at output bus 380.

Period register 301, period counter 303 and comparator 305 comprise a modulo-L counter. To use this counter, period register 301 is loaded via bus 350 with the value L. Period counter 303 begins at zero and is incremented by an output pixel clock (not shown) over bus 354. When the count becomes equal to L, counter 303 is synchronously cleared by a signal at the output of comparator 305 via bus 358. Thus, the counter 303 counts from zero to L-1 to inform the system where it is within the scaling period.

Increment look-up table 307 is addressed by the period count on bus 356b and contains integer values which control incrementation of a pointer which points to the next "left" input pixel via bus 360. The "left" pixel is that pixel in the input data stream which is immediately to the left of (or coincident with) the current output pixel. The "right" pixel is that input pixel which is immediately to the right of the current output pixel. The left and right pixel pairs being used to interpolate the current output pixel are stored in successive memory locations in input image RAM 315. For example, when computing an interpolated value for output pixel 2 of FIG. 2, input pixel $X_2$ would comprise the left input pixel and input pixel $X_3$ would comprise the right input pixel.

The contents of increment look-up table 307 comprise L increment values and these values always sum to M. The increment look-up table contains the function inc-val (1) which describes the number of address units to increment the input pixel pointer at each point in the scaling period in order to obtain the next pair of input pixels to be used. inc-val (1) is given by $$inc\text{-}val(l) = \left\lfloor \frac{M + (lM \text{ modulo } L)}{L} \right\rfloor \qquad (6)$$

where 1 is an integer in the set [0,L-1] and
$\lfloor X \rfloor$ = the integer that is equal to or lower than X.

Everything inside the dashed lines shown in FIG. 3 (i.e. look-up tables 309 and 311, multipliers 317 and 319 and adder 321) could be implemented by a single large look-up table. This is the implementation used in the method set forth by the pseudo code description given in the Appendix to the specification. Such a large look-up table would be addressed by the period count given by the modulo-L counter and the left and right input pixel values. An alternative implementation would be to use the smaller left and right kernel look-up tables 309 and 311 of FIG. 3, along with multipliers 317 and 319 and adder 321. Yet another implementation would combine the kernel look-up table and the multiplier into moderately sized look-up tables for left and right pixels.

If we represent the contents of the left kernel look-up table 309 by 1-kern(I) and the contents of the right kernel look-up table 311 by r-kern(I), we have $$l\_kern(l) = h(lM \text{ modulo } L), \; l \text{ an integer in the set } [0, L-1] \qquad (7)$$

$$r\_kern(l) = L[(lM \text{ modulo } L) - L], \; l \text{ an integer in the set } [0, L-1] \qquad (8)$$

h(k) is the impulse response of the interpolating filter. As noted before, h(k) is assumed to be non-zero over at most 2L-1 samples. Specific formulas for h(k) for bilinear interpolation, 2×2 average averaging and replication/sub-sampling are given in the table below.

| Interpolating Function | h(k) |
|---|---|
| Bilinear Interpolation | $h(k) = \frac{L - |k|}{L}$; k in the set $[-L + 1, L - 1]$ |
| 2 × 2 averaging | h(k) = 0.5; k in the set [-1, 0] |
| Replication/sub-sampling | h(k) = 1; k in the set [0, L-1] |

We turn now to an example of use of the method and apparatus of the invention wherein a scale factor of 5/8 is desired—i.e. L=5 and M=8, and wherein bilinear interpolation is desired.

First, using equation 6, we generate the L, or 5, increment look-up table values for table 307 of FIG. 3:

$$inc\text{-}val(0) = \left\lfloor \frac{8}{5} \right\rfloor = 1$$

$$inc\text{-}val(1) = \left\lfloor \frac{8 + [8 \text{ modulo } 5]}{5} \right\rfloor = \left\lfloor \frac{8 + 3}{5} \right\rfloor = 2$$

$$inc\text{-}val(2) = \left\lfloor \frac{8 + 16 \text{ modulo } 5}{5} \right\rfloor = \left\lfloor \frac{8 + 1}{5} \right\rfloor = 1$$

$$inc\text{-}val(3) = \left\lfloor \frac{8 + 24 \text{ modulo } 5}{5} \right\rfloor = \left\lfloor \frac{8 + 4}{5} \right\rfloor = 2$$

$$inc\text{-}val(4) = \left\lfloor \frac{8 + 32 \text{ modulo } 5}{5} \right\rfloor = \left\lfloor \frac{8 + 2}{5} \right\rfloor = 2$$

Next, we generate the 5 entries from the left and right convolution kernel look-up tables 309 and 311 of FIG. 3, using equations 7 and 8, respectively, in conjunction with the expression for h(k) from the table above for bilinear interpolation:

| | |
|---|---|
| $l\_kern\;(0) = h(0) = \frac{5}{5} = 1$ | $r\_kern\;(0) = h(-5) = 0$ |
| $l\_kern\;(1) = h(3) = \frac{5-3}{5} = 0.4$ | $r\_kern\;(1) = h(-2) = 0.6$ |
| $l\_kern\;(2) = h(1) = \frac{5-1}{5} = 0.8$ | $r\_kern\;(2) = h(-4) = 0.2$ |
| $l\_kern\;(3) = h(4) = \frac{5-4}{5} = 0.2$ | $r\_kern\;(3) = h(-1) = 0.8$ |
| $l\_kern\;(4) = h(2) = \frac{5-2}{5} = 0.6$ | $r\_kern\;(4) = h(-3) = 0.4$ |

Now, the interpolated output pixels 1–5 as shown in FIG. 2 are generated using the period count and the look-up tables of FIG. 3. The results are, as follows:

1st Output Pixel 1

Period Counter=0, next increment to input pixel RAM 315 address=1

| | |
|---|---|
| Left Pel = $X_1$ | Right Pel = $X_2$ |
| Left Kernel value = 1 | Right Kernel Value = 0 |
| Output Pixel 1 = $1.X_1 + 0 \cdot X_2 = X_1$ | |
| new left Pel = $X_2$ | new right Pel = $X_3$ |

2d Output Pixel 2

Period counter=1, next increment to input RAM 315 address=2

| | |
|---|---|
| Left Pel = $X_2$ | Right Pel = $X_3$ |
| Left Kernel value = 0.4 | Right Kernel value = 0.6 |
| Output Pixel 2 = $.4X_2 + .6X_3$ | |
| New Left Pel = $X_4$ | New Right Pel = $X_5$ |

3d Output Pixel 3

Period counter=2, next increment to input RAM 315 address=1

| | |
|---|---|
| Left Pel = $X_4$ | Right Pel = $X_5$ |
| Left Kernel Value = 0.8 | Right Kernel Value = 0.2 |
| Output Pixel 3 = $.8X_4 + .2X_5$ | |
| New left Pel = $X_5$ | New right Pel = $X_6$ |

4th Output Pixel 4

Period counter = 3, next increment to input RAM 315 address = 2

| | |
|---|---|
| Left Pel = $X_5$ | Right Pel = $X_6$ |
| Left Kernel value = 0.2 | Right Kernel value = 0.8 |
| Output Pel 4 = $.2X_5 + .8X_6$ | |
| New Left Pel = $X_7$ | New Right Pel = $X_8$ |

5th Output Pixel 5

Period Counter = 4 Next increment to input RAM address = 2

| | |
|---|---|
| Left Pel = $X_7$ | Right Pel = $X_8$ |
| Left Kernel Value = 0.6 | Right Kernel Value = 0.4 |
| Output Pixel 5 = $.6X_7 + .4X_8$ | |

As a final example of up-scaling using bilinear interpolation, we reverse the values of L and M for a scale factor of 8/5.

The increment look-up table 307 values, using equation 6, are:

$$inc\text{-}val(0) = \lfloor 5/8 \rfloor = 0$$

$$inc\text{-}val(1) = \left\lfloor \frac{5+5}{8} \right\rfloor = 1$$

$$inc\text{-}val(2) = \left\lfloor \frac{5+2}{8} \right\rfloor = 0$$

$$inc\text{-}val(3) = \left\lfloor \frac{5+7}{8} \right\rfloor = 1$$

$$inc\text{-}val(4) = \left\lfloor \frac{5+4}{8} \right\rfloor = 1$$

$$inc\text{-}val(5) = \left\lfloor \frac{5+1}{8} \right\rfloor = 0$$

$$inc\text{-}val(6) = \left\lfloor \frac{5+6}{8} \right\rfloor = 1$$

$$inc\text{-}val(7) = \left\lfloor \frac{5+3}{8} \right\rfloor = 1$$

The 8 entries for the left and right convolution kernel tables 309 and 311 are given by equations 7 and 8 as:

| | |
|---|---|
| l_kern (0) = h(0) = 1 | r_kern (0) = h(−8) = 0 |
| l_kern (1) = h(5) = .375 | r_kern (1) = h(−3) = .625 |
| l_kern (2) = h(2) = .75 | r_kern (2) = h(−6) = .25 |
| l_kern (3) = h(7) = .125 | r_kern (3) = h(−1) = .875 |
| l_kern (4) = h(4) = .5 | r_kern (4) = h(4) = .5 |
| l_kern (5) = h(1) = .875 | r_kern (5) = h(7) = .125 |
| l_kern (6) = h(6) = .25 | r_kern (6) = h(−2) = .75 |
| l_kern (7) = h(3) = .625 | r_kern (7) = h(−5) = .375 |

The interpolated output pixels 1-8 as shown in FIG. 2A are generated using the period count and the look-up tables of FIG. 3. The results are:

| | |
|---|---|
| 1st output pixel: | left input pel = $X_1$, right input pel = $X_2$ |
| period count = 0 | 1st output pixel = $1.X_1 + 0.X_2 = X_1$ |
| | next left pel = $X_1$, next right pel = $X_2$ |
| 2d output pixel | |
| period count = 1 | 2d output pixel = $.375X_1 + .625 X_2$ |
| | next left pel = $X_2$, next right pel = $X_3$ |
| 3d output pixel | |
| period count = 2 | 3rd output pixel = $.75X_2 + .25X_3$ |
| | next left pel = $X_2$, next right pel = $X_3$ |
| 4th output pixel | |
| period count = 3 | 4th output pixel = $.125X_2 + .875X_3$ |
| | next left pel = $X_3$, next right pel = $X_4$ |
| 5th output pixel | |
| period count = 4 | 5th output pixel = $.5X_3 + .5X_4$ |
| | next left pel = $X_4$, next right pel = $X_5$ |
| 6th output pixel | |
| period count = 5 | 6th output pixel = $.875X_4 + .125X_5$ |
| | next left pel = $X_4$, next right pel = $X_5$ |
| 7th output pixel | |
| period count = 6 | 7th output pixel = $.25X_4 + .75X_5$ |
| | next left pel = $X_5$, next right pel = $X_6$ |
| 8th output pixel | |
| period count = 7 | 8th output pixel = $.625X_5 + .375X_6$ |
| | next left pel = $X_6$, next right pel = $X_7$ |
| 9th output pixel | |
| period count = 0 | 9th output pixel = $X_6$ |

The invention has been disclosed with reference to specific embodiments which are given solely for the sake of example. The invention is to be measured by the proper interpretation of the appended claims.

APPENDIX
For Scaling With A Single Large Look-Up Table

```
/* Main */
unsigned char two_interp_lines[TWO_LINES];    /*Global buffer. Holds two interpolated
                                                lines for use in interpolating between lines. */
fill_inc_lut (up, down, inc_lut);             /*Create input pointer increment LUT.
                                                up and down are L and M respectively.
                                                inc_lut is the increment LUT. */ fill_inter_lut (up, down, function, inter_lut);
                                              /*Create interpolation LUT. It will be
                                                addressed by 2 pixels and the period count. */
outpix = up*(inpix-1)/down + 1;               /*Ensures we won't try to interpolate
                                                beyond the last original pixel. */
outlines = up*(inlines-1)/down + 1;
line_period_counter = 0;
last_lper_counter = 0;
```

APPENDIX
For Scaling With A Single Large Look-Up Table

```
for (l=0; l<outlines; l++){
    start_flag = (l==0);                                    /*put_interp_line needs to handle first line
                                                              as a special case. */
    put_interp_line (output_pointer, outpix, input_pointer, inpix,
        line_period_counter, last_lper_counter, up, inc_lut,
        interp_lut, start_flag);
                                                            /*Put an interpolated line in the
                                                              output buffer. */
    output_pointer = output_pointer + outpix;
                                                            /*Update the output pointer. */
    input_pointer = input_pointer + inc_lut[line_period_counter]*inpix;
                                                            /*Update the input pointer
                                                              according to inc_lut[]. */
    last_lper_counter = line_period_counter;
                                                            /*Store the current value of the
                                                              line period counter. */
    line_period_counter = (line_period_counter + 1)%up;
                                                            /*Update the modulo-L line period counter. */
}
/* Fill increment LUT */
void fill_inc_lut (up, down, inc_lut)
current_position = 0;
for (i=0; i<up; i++){                                       /*Implement Equation 6. */
    inc_lut[i] = (current_position + down)/up;
    current_position = (current_position + down)%up;
}
/* Fill interpolation LUT */
void fill_interp_lut (up, down, function, interp_lut)
switch (function){
    case 'r':                                               /*Table is for replication/sub-sampling */
        for (p1=0; p1<256; p1++)                            /*For replication, output is always left
                                                              pixel value. */
            for (p2=0; p2<256; p2++)
                for (per_cnt=0; per_cnt<up; per_cnt++)
                    *(interp_lut+(p1<<12)+(p2<<4)+per_cnt) = p1;
        break;
    case 'a':                                               /*Table is for 2x2 averaging. Used only
                                                              for 1:2. Period count is always 0. */
        for (p1=0; p1<256; p1++)
            for (p2=0; p2<256; p2++)
                *(interp_lut+(p1<<12)+(p2<<4)) = (p1+p2+1>>1;
                                                            /*LUT contains rounded average of
                                                              p1 and p2. */
        break;
    case 'b':                                               /*Table is for bilinear interpolation. */
        for (i=0; i<up; i++){
            mod_addr = (i*down)%up;
                                                            /*Compute left and right kernel LUT's
                                                              with 12-bit precision. */
            blikern[i] = (int) (4096*(1.0-(double)mod_addr/up)+0.5);
            blikern[i] = 4096 - blikern[i];
        }
        for (p1=0; p1<256; p1++)                            /*LUT contains rounded weighted average
                                                              of p1 and p2. */
            for (p2=0;p2<256;p2++)
                for (per_cnt=0;per_cnt<up; per_cnt++)
                    *(interp_lut+(p1<<12)+(p2<<4)+per_cnt) =
                        (p1*blikern[per_cnt]+p2*blikern[per_cnt]+2048)>>12;
        break;
}
/* Put an interpolated line in the output buffer */
extern unsigned char two_interp_lines[TWO_LINES];
                                                            /*Global buffer. Holds two interpolated
                                                              lines for use interpolating between
                                                              lines. */
void put_interp_line (output_pointer, outpix, input_pointer, inpix,
        line_period_counter, last_lper_counter, up, inc_lut,
        interp_lut, start_flag)
/* If this is the first line (start_flag==1) or if the previous line increment value
is 2 or more, then interpolate 2 new lines. If the previous line increment value
is 1, one interpolated line can be reused. It is shifted to the start of the
buffer and then a new line is interpolated after it. If the previous line increment
value is 0, both previously interpolated lines can be used again. */
if (start_flag || (inc_lut[last_lper_counter]>=2)){
    pixel_period_counter = 0;
    for (p=0; p<2*outpix; p++){
                                                            /* Interpolate 2 new lines. */
        two_interp_lines[p] = *(interp_lut+(*input_pointer<<12)+
            (*input_pointer+1)<<4)+pixel_period_counter);
        input_pointer = input_pointer + inc_lut[pixel_period_counter];
```

-continued
APPENDIX
For Scaling With A Single Large Look-Up Table

```
            pixel_period_counter = (pixel_period_counter+1)%up;
       }
    } else if (inc_lut[last_lper_counter]==1){
                                                        /* Shift 1 line, interpolate another. */
       for (p=0; p<outpix; p++)                         /* Shift line. */
          two_interp_lines[p] = two_interp_lines[p+outpix];
       pixel_period_counter = 0;
       input_pointer = input_pointer + inpix;
       for (p=outpix; p<2*outpix; p++){
                                                        /* Interpolate a new line. */
          two_interp_lines[p] = *(interp_lut+(*input_pointer<<12)+
                 (*(input_pointer+1)<<4)+pixel_period_counter);
          input_pointer = input_pointer + inc_lut[pixel_period_counter];
          pixel_period_counter = (pixel_period_counter+1)%up;
       }
    }
                                                        /* Otherwise no change is required
                                                           to two_interp_lines[] */
    /* Now put an interpolated line in the output buffer. */
    for (p=0; p<outpix; p++){
       *output_pointer = *(interp_lut+(two_interp_lines[p]<<12)+
              (two_interp_lines[p+outpix]<<4)+line_period_counter);
       output_pointer = output_pointer + 1;
    }
 return;
```

I claim:

1. A method or scaling image data organized as rows of input pixels by a reduced rational factor of L/M, where L and M are integers, comprising the steps of:
   (a) selecting a left input pixel and a right input pixel and generating a left and right input pixel signals related to gray scale image intensity;
   (b) generating a period address signal with a modulo-L counter;
   (c) obtaining a left convolution kernel value from a look-up table containing L values and generating a left convolution kernel signal by using the period address signal as a look-up table address;
   (d) obtaining a right convolution kernel value from a look-up table containing L values and generating a right convolution kernel signal by using the period address signal as a look-up table address;
   (e) multiplying the left input pixel signal by the right convolution kernel signal;
   (f) multiplying the right input pixel signal by the right convolution kernel signal;
   (g) adding multiplied results of steps (e) and (f) to obtain a scaled output pixel signal;
   (h) selecting a new left input pixel and a new right input pixel and generating new left and right input pixel signals; and
   (i) returning to step (b) if all input pixels in a row have not been processed wherein the rows of input pixels are stored in an input image memory and wherein step (h) is performed by obtaining an input image memory address increment from an increment look-up table having L increment values which sum to M and generating an increment address signal, the increment look-up table being addressed in accordance with the period address signal, and wherein the rational factor L/M is reduced.

2. The method of claim 1, wherein the next left pixel is located at the input image memory address increment identified by the increment address signal and the new right pixel is located at the input image memory address increment identified by the increment address signal plus one address.

3. The method of claim 1, wherein steps (c) through (g) are combined by utilizing a single look-up table whose address is a function of the left input pixel signal, the right input pixel signal and the period address signal, the contents of the single look-up table comprising output pixel signals.

4. The method of claim 1, wherein each left convolution kernel value at look-up table address l is given by $$h \text{ (lM modulo L)}$$

where l is an integer in the set and where h is an impulse response of a preselected interpolating filter.

5. The method of claim 4, wherein each right convolution kernel value at look-up table address l is given by $$h \text{ (lM modulo L-L)}.$$

6. The method of claim 5, wherein bilinear interpolation is used by the preselected interpolating filter, such that $$h(k) = \frac{L - |k|}{L}$$

for k an integer in the set.

7. The method of claim 2, wherein each increment value at increment look-up table address l is given by $$\left\lfloor \frac{M + (lM \text{ modulo } L)}{L} \right\rfloor$$

where l is an integer in the set and where $\lfloor X \rfloor$ is an integer less than or equal to X.

8. Apparatus for scaling image data organized as rows of input pixels by a reduced rational factor of L/M, where L and M are integers, comprising:
   storage means for storing the rows of input pixels;
   period address generating means for sequentially generating L period addresses;

input pixel interpolation means coupled to the storage means and the period address generating means for generating L output pixels for every M input pixels, the interpolation means operative to generate an interpolated output pixel as a function of two current adjacent input pixels of interest wherein the input pixel interpolation means comprises a interpolation look-up table whose contents comprises output pixel values addressed as a function of a current period address and values of the two current input pixels of interest;

address incrementing means coupled to the period address generating means and the storage means for selecting a next two adjacent output pixels for a subsequent operation of the interpolation means wherein the address incrementing means includes an increment look-up table having L incrementing values addressed in accordance with the period address, and address control means coupled between an output of the increment look-up table and the storage means, the address control means operative to increment an address of the storage means in accordance with an incrementing value from the increment look-up table to designate the next two adjacent input pixels wherein the rational factor L/M is reduced, and wherein said L incrementing values sum to M.

9. The apparatus of claim 8 wherein the input pixel interpolation means comprises:
 a first convolution kernel look-up table having L first kernel values and addressed in accordance with the period address;
 a second convolution kernel look-up table having L second kernel values and addressed in accordance with the period address;
 a first multiplier coupled to an output of the first convolution kernel look-up table and to the storage means for generating at a first multiplier output a product of a selected first kernel value and a first one of the two current adjacent input pixels of interest;
 a second multiplier coupled to an output of the second convolution kernel look-up table and to the storage means for generating at a second multiplier output a product of a selected second kernel value and a second one of the two current adjacent input pixels of interest; and
 an adder having a first input coupled to the first multiplier output, a second input coupled to the second multiplier output, the adder operative to generate an interpolated output pixel as a sum of values appearing at the first and second adder inputs.

10. The apparatus of claim 8 wherein each incrementing value at increment look-up table address 1 is given by $$\left\lfloor \frac{M + (lM \bmod L)}{L} \right\rfloor$$

where 1 is an integer in the set and where $\lfloor X \rfloor$ is an integer less than or equal to X.

11. The apparatus of claim 9 wherein each first kernel value at first convolution kernel look-up table address 1 is given by $$h (lM \bmod L)$$

and wherein each second kernel value at second convolution kernel look-up table address 1 is given by $$h (lM \bmod L - L)$$

where 1 is an integer in the set and h is an impulse response of a preselected interpolating filter.

12. The apparatus of claim 11 wherein bilinear interpolation is used by the preselected interpolating filter, such that $$h(k) = \frac{L - |k|}{L}$$

for k an integer in the set.

* * * * *

UNITED STATES PATENT AND TRADEMARK OFFICE
CERTIFICATE OF CORRECTION

PATENT NO. : 5,410,616
DATED : 04/25/95
INVENTOR(S) : Robert C. Kidd

It is certified that error appears in the above-indentified patent and that said Letters Patent is hereby corrected as shown below:

Title page, "LOOP-UP" should be --LOOK-UP--
Col. 4, Line 2, after "and" insert -- ⊕ --
Col. 7, Line 62, 2nd occurrence of "inter" should --interp--
Col. 11, Line 29, "or" should be --for--
Col. 11, Line 45, "right" should be --left--
Col. 12, Line 37, "h(IM modulo L)" should be --h(1M modulo L)--
Col. 12, Line 39, after "set" insert --[0, L-1]--
Col. 12, Line 53, after "set" insert --[-L+1, L-1]--
Col. 12, Line 61, after "set" insert --[0, L-1]--
Col. 14, Line 20, after "set" insert --[0, L-1]--
Col. 14, Line 32, after "set" insert --[0, L-1]--
Col. 14, Line 41, after "set" insert --[-L+1, L-1]--

Signed and Sealed this

Fifteenth Day of August, 1995

Attest:

BRUCE LEHMAN

*Attesting Officer*         *Commissioner of Patents and Trademarks*